(12) United States Patent
Brewer

(10) Patent No.: US 7,284,790 B1
(45) Date of Patent: Oct. 23, 2007

(54) BABY SEAT COVER DIAPER BAG/ACTIVITY CENTER

(76) Inventor: Marvelee Johnson Brewer, 425 E. 100 N., Moab, UT (US) 84532

( * ) Notice: Subject to any disclaimer, the term of this patent is extended or adjusted under 35 U.S.C. 154(b) by 66 days.

(21) Appl. No.: 10/738,552

(22) Filed: Dec. 16, 2003

Related U.S. Application Data

(60) Provisional application No. 60/433,277, filed on Dec. 16, 2002.

(51) Int. Cl.
*A47C 7/66* (2006.01)

(52) U.S. Cl. .............. 297/184.13; 297/219.12

(58) Field of Classification Search ............ 297/183.2, 297/183.3, 183.4, 184.13, 219.12, 184.11
See application file for complete search history.

(56) References Cited

U.S. PATENT DOCUMENTS

| | | | | | |
|---|---|---|---|---|---|
| 5,322,343 | A | * | 6/1994 | Parker et al. ............ | 297/183.3 |
| 5,522,639 | A | * | 6/1996 | Jaime ..................... | 297/184.13 |
| 5,730,490 | A | * | 3/1998 | Mortenson ............. | 297/184.13 |
| 6,019,421 | A | * | 2/2000 | Roh ....................... | 297/184.13 |
| 6,056,355 | A | * | 5/2000 | Klassen ................. | 297/184.13 |
| 6,209,953 | B1 | * | 4/2001 | Mackay et al. ........ | 297/184.13 |
| 6,367,875 | B1 | * | 4/2002 | Bapst ..................... | 297/250.1 |
| 6,481,791 | B1 | * | 11/2002 | Facchini et al. ....... | 297/184.13 |
| 6,547,325 | B2 | * | 4/2003 | Drost et al. ............ | 297/219.12 |

* cited by examiner

*Primary Examiner*—Peter R. Brown

(57) ABSTRACT

A car seat cover diaper bag for infants includes a diaper bag which is configured for mounting on a baby seat. The diaper bag preferably has one or more pockets for holding baby implements so a separate diaper bag does not have to be carried by the caregiver of an infant. The diaper bag also preferably includes mechanisms for holding toys in front of an infant and playing music for an infant seated in a baby seat. The diaper bag also has a mechanism for monitoring an infant seated in a baby seat.

14 Claims, 15 Drawing Sheets

BABY SEAT COVER DIAPER BAG/ACTIVITY CENTER

CROSS-REFERENCE TO RELATED APPLICATIONS

The present invention claims benefit of U.S. Provisional Patent Application No. 60/433,277, filed Dec. 16, 2002 which is expressly incorporated herein by reference.

STATEMENT REGARDING FEDERALLY SPONSORED RESEARCH AND DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The invention relates to baby care product holders (conventionally known as diaper bags) and baby seat covers. More specifically, the present invention relates to a decorative diaper bag supported by a baby seat with an entertainment component.

A baby seat conventionally known as an infant car seat or infant carrier is routinely used for transporting infant children. A diaper bag (similar to a woman's purse) is routinely used to transport baby care products such as diapers, bottles, diaper wipes, pacifiers, diaper rash ointments, burp cloths, toys and the like. Until the present invention, caregivers of infant children have found it necessary to carry both a baby seat and the diaper bag everywhere a baby is transported. (If an infant is transported by car, an infant car seat is required by law.) If the diaper bag is left behind, the caregiver finds him or herself ill prepared to care for an infant who has soiled his or her diaper, feed a hungry bottle-fed infant and/or pacify a crying infant.

Numerous car seat cover inventions exist which have been designed with a configuration for wrapping around or enveloping an infant car seat/carrier with the main purpose of providing protection to an infant seated in said baby seat. Inventions such as U.S. Pat. Nos. 6,056,355 and 5,956,767 were designed to wrap around said baby seat to protect a seated infant from the cold, acting as a blanket. U.S. Pat. Nos. 6,019,421 and 6,039,393 were designed to protect the seated infant from the weather elements and/or insects with a cover that envelops said baby seat. The invention described in U.S. Pat. No. 6,517,153, invented by the inventor of the present invention, was also designed to provide protection from the weather elements, insects and germ transmission by unsolicited touching of the infant's hands.

Several styles of diaper bags also exist which are used for transporting baby care products. U.S. Pat. Nos. D,390,700 and D,326,188 are diaper bags which mimic a woman's purse. U.S. Pat. No. D,419,763 looks like or piece of luggage in shape and acts like a diaper bag in convention. U.S. Pat. Nos. 6,298,993 and 6,298,509 describe inventions designed to convert from a diaper bag to a diaper changing station.

Still other inventions exist which combine seat covers with tote bags or diaper bags such as U.S. Pat. No. 5,938,336 which could be considered more of a seat liner with pockets, not designed specifically for use with a baby, and U.S. Pat. Nos. 5,855,412 and 5,829,835 which are specifically designed for use with babies, but are also more seat liners for use under a seated baby not covers designed to fit over an infant seated in an infant car seat/carrier.

Other inventions such as U.S. Pat. Nos. 5,333,769 and 4,698,862 combine baby carriers with diaper bags. Such inventions require the baby be removed from the infant car seat in order to use it. Caregivers of infants can appreciate the desire to leave a sleeping baby in its car seat so as not to arouse it. It also appears that such inventions are not useable as a baby carrier and a diaper bag in the same embodiment. These inventions are not covers for baby seats, but rather the seat itself.

Other inventions exist to entertain infants seated in a baby seat. U.S. Pat. No. 5,411,315 incorporates a toy bar for entertaining purposes but it is an entirely different type of baby seat and does not incorporate a diaper bag. U.S. Pat. No. 6,517,153 referenced above also incorporates an entertainment feature utilizing the support from the infant carrier sun visor. Again, said invention is a protective cover. It is not intended as a diaper bag.

BRIEF SUMMARY OF THE INVENTION

The present invention merges a baby seat cover with a diaper bag to create an infant baby seat supported diaper bag which envelopes the baby seat and acts as one unit such that the diaper bag goes everywhere the baby seat goes without the need for toting a separate bag. Thus, the risk of forgetting the diaper bag is eliminated whenever an infant is transported in a baby seat or infant carrier as it is conventionally called.

Many women who are caregivers of an infant use a diaper bag to carry the items they would normally carry in a purse so they only have to carry one bag instead of two. The present invention reduces the number of bags a caregiver of infant children needs to carry from one or two bags to zero bags. Only the baby seat with the present invention attached to or enveloping it need be carried with the seated infant. With the present invention, a man transporting an infant can't be accused of carrying a purse since the diaper bag appears to be part of the car seat. Thus, it may be desirable to have a diaper bag that can be attached or supported by a baby seat such that the caregiver can carry the baby seat and diaper bag as one unit.

One object of the present invention shaped in a design such as a car (or other design) is the entertainment value it provides to the person toting the decorative baby seat cover diaper bag. What parent isn't just bursting with pride over their precious little one? A decorative cover on the baby seat draws attention from passers by. Proud parents are likely to get plenty of oohs and aahs.

An advantage of the present invention is that it incorporates a means for entertaining the seated infant by positioning toys within reach of the infant. Thus, the toys are never dropped out of the sight of the infant.

The present invention also provides a feature for soothing the seated infant with music and another feature, a mirror-like reflecting device, for a caregiver sitting in the front seat of a vehicle to use to monitor an infant seated in a rear-facing car seat of said vehicle.

Preferably, the cover/diaper bag is made of a washable textile material, so it can be tossed in the washing machine for laundering, with said textile material further being water repellant so the items carried in the diaper bag don't get wet during inclement weather.

The present invention is different from the prior art described above. It makes no claims for protection of an infant seated in an infant car seat or carrier. The purpose of the baby seat cover of the present invention is to create the sidewalls of a diaper bag and provide support for said diaper bag. The present invention also makes no claims for providing a diaper changing station and does not resemble a woman's purse or a piece of luggage. Further the present invention is not a baby seat or a protective cover for a baby seat that entertains but rather a diaper bag that incorporates an entertainment feature.

For the sake of clarity, several naming conventions have been used throughout this specification. For example, "baby" and "infant" are used interchangeably. These references are meant to include any human being under the age of two. Although a specific kind of baby seat (infant car seat/carrier) is represented, the scope of the present invention is meant to include all seats, carriers and/or beds designed for holding or toting an infant and to which the present invention could be adapted. For that matter, the invention could be adapted to include baby cribs, toddler beds and twin beds on a larger scale. The terms "seat" is meant to be incisive of any seat, carrier or other type of bed to which the present invention could be adapted. Baby "implement" or "implements" is meant to include any and all items used in caring for a baby such as one would put in a diaper bag, e.g., diapers, wipes, medicines, toys, blankets, clothes, food, bottles, pacifiers, etc., including items carried by a caregiver, e.g., wallet, keys, checkbook, etc.

BRIEF DESCRIPTION OF THE SEVERAL VIEWS OF THE DRAWING

In the following drawings, shading is used as a means of differentiating the invention from prior art or other items that are not part of the present invention when prior art and the invention are presented in the same drawing. For clarification purposes, shading has also been incorporated to depict negative space or holes/cutouts in the invention. An explanation of all shading will be provided in the detailed description of the invention.

DETAILED DESCRIPTION OF THE INVENTION

Figure 1:
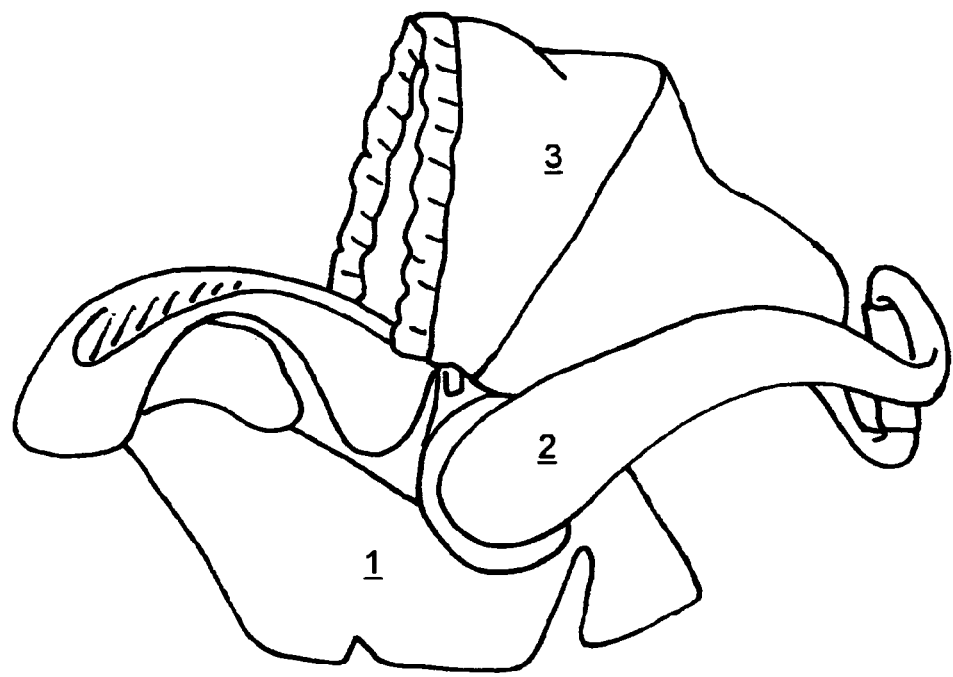
FIG. 1: Baby seat with sun visor (prior art)
Figure 2:
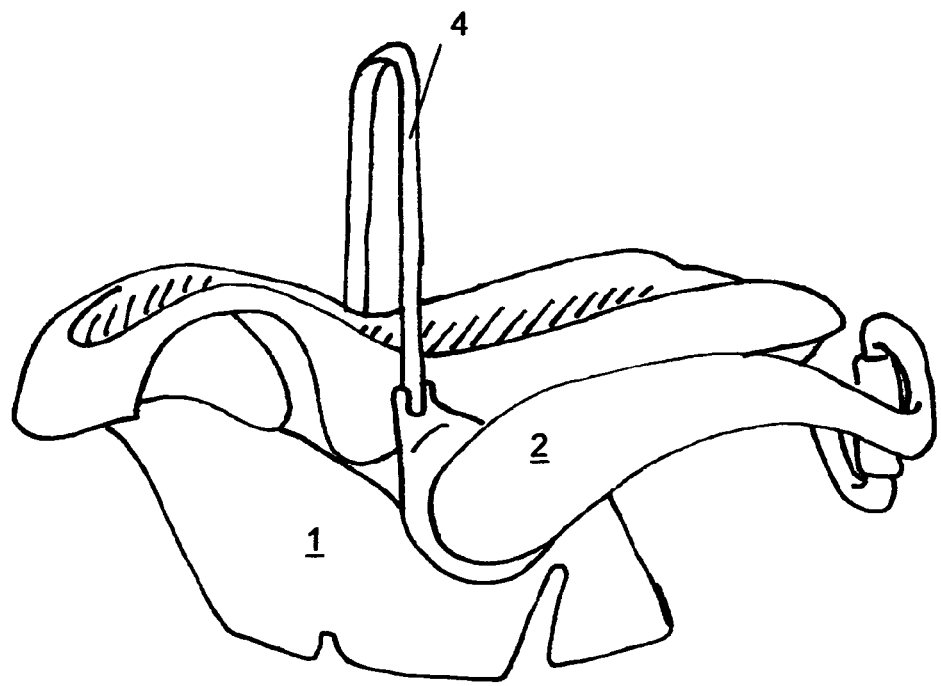
FIG. 2: Baby seat without sun visor with sun visor support (prior art)

FIGS. 1 & 2 depict a conventional infant car seat and carrier (1) with a handle (2); a sun visor hood (3); and a sun visor support member (4). The sun visor is supported by three basic elements: the end of the seat to which the infant's head is oriented when seated (We'll call it the head of the baby seat for identification purposes); a middle support which attaches to or is built-in to the sun visor hood (part of the hood); and a sturdy, yet flexible, support which attaches to the seat itself (part of the baby seat, not the hood) and is configured with a channel for receiving the hood as a means of support (We'll call it a sun visor support member for identification purposes).

Figure 3:
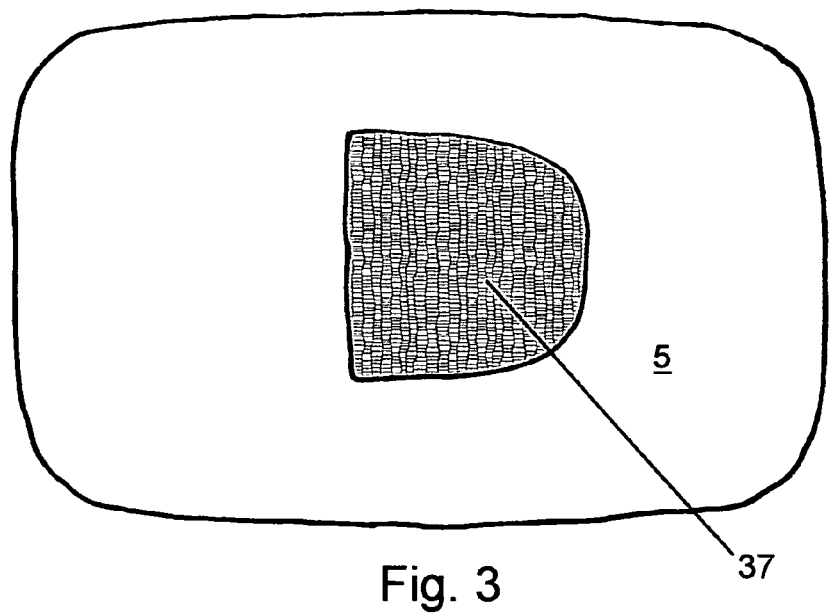
FIG. 3: Basic design cover, flat, top view

FIG. 3 depicts the basic design of the cover (5) which forms the side-walls of the diaper bag. By itself, the cover has no apparent function. The cover is constructed of a textile material, ideally a water repellant nylon for the purpose of the present invention. The shaded area in the center represents cutout (37) in the invention through which the infant can be seated and unseated without removing the invention.

Figure 4:
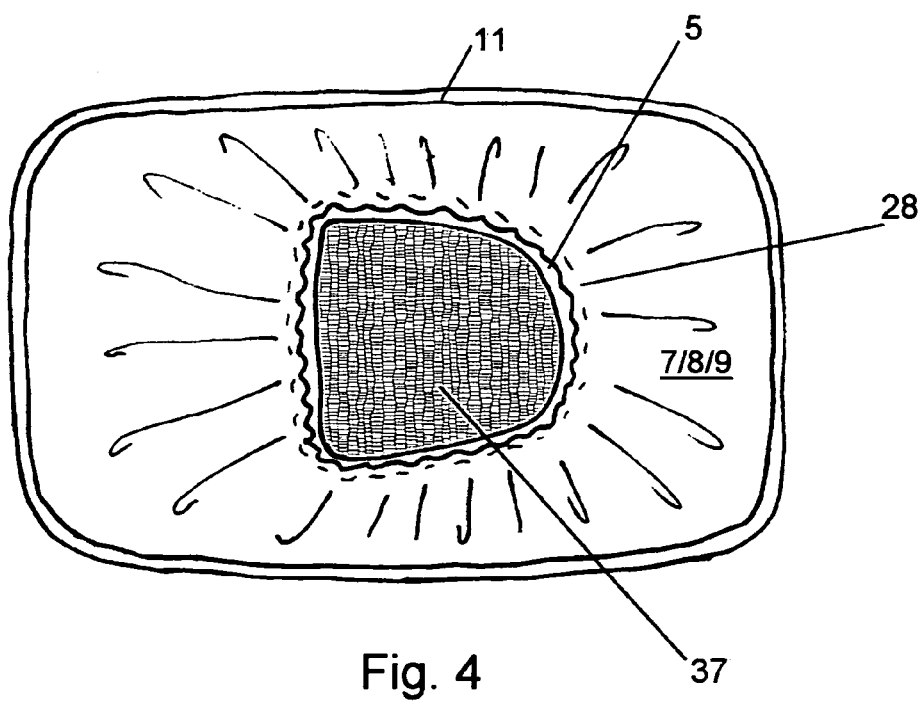
FIG. 4: Basic design diaper bag, flat, top view

FIG. 4 depicts the same cover (5) with another or second layer of textile material (preferably of the same type as noted in FIG. 3 narrative above) placed on top of it to form one continuous pocket (7/8/9) when attached together at the outside perimeter by a perimeter casing (11). The inside perimeter of the pocket also contains a perimeter casing (28) with elastic inserted. The inside perimeter of the top layer does not attach to the bottom layer, but rather sits on top of it such that a pocket is created between the two layers. For identification purposes, the pocket has been labeled "7/8/9". Subsequent drawings will show three pockets (7, 8 & 9) formed between cover (5) and the second layer. The number, size and shape of the pockets are not as important as the function they serve. Attaching two identical layers of textile material together around the outside perimeter would also form a pocket, but such a pocket would likely only hold small, flat objects when the textile material is pulled tight around a baby seat. The pocket(s) in the present invention is (are) configured such that it (they) can hold baby care products when the cover is pulled tight around a baby seat. The utility of the pocket will be made clear in subsequent drawing narrative.

Figure 5:
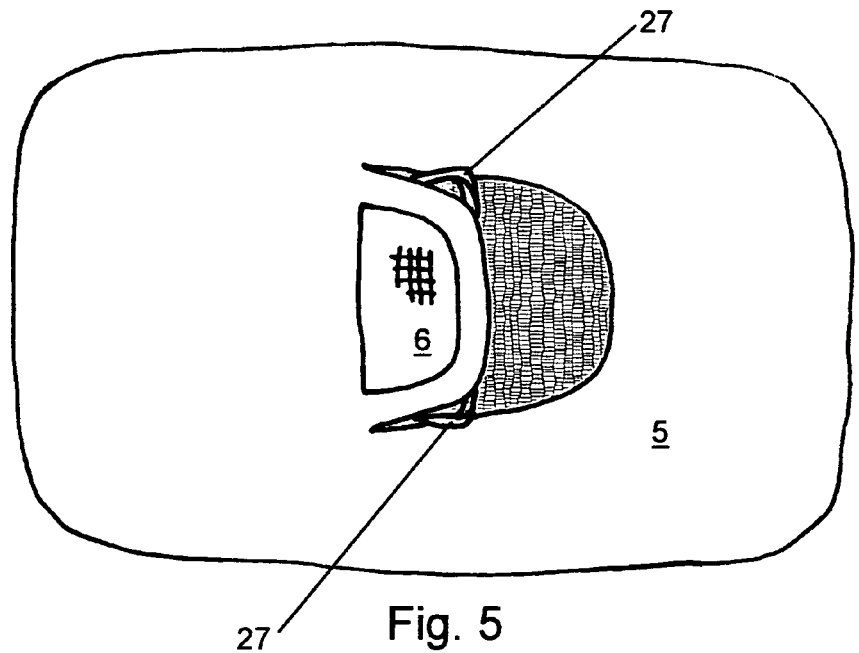
FIG. 5: Car design cover, flat, top view

FIG. 5 shows the same cover as FIG. 3 but designed to look like an automobile when the cover (5) is completely assembled. In this figure, a mesh-type window (6) is depicted attached to the cover, as are two cloth support mechanisms (27) which will be shown in further detail in later drawings.

Figure 6:
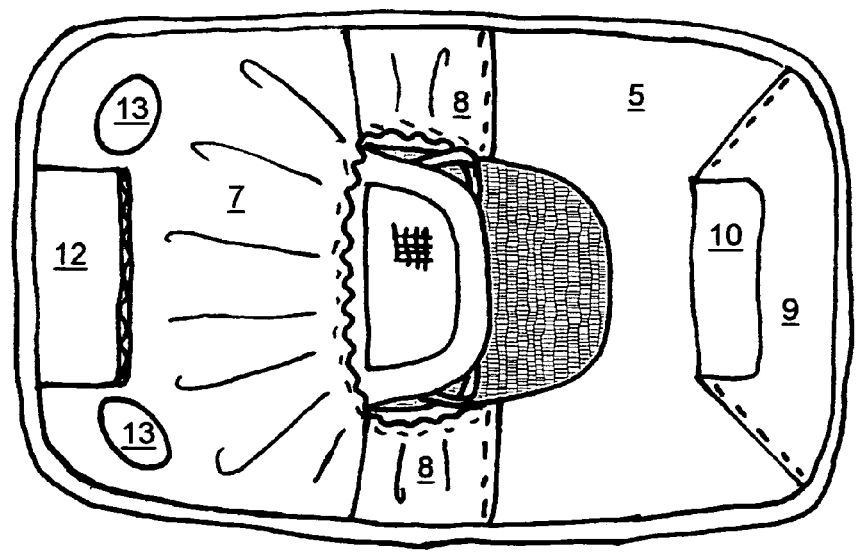
FIG. 6: Car design diaper bag, flat, top view

FIG. 6 shows the same cover (5) as FIG. 5, but with pockets and decorations added. Instead of one continuous pocket as in FIG. 4, this embodiment contains a front pocket (7), two side pockets (8), a rear pocket (9) and a front zippered pocket (12). Items 10 and the two 13's are for decoration purposes in making the invention resemble an automobile when fully assembled. Such decorations could also be made into pockets, but for the purpose of this illustration, they are either painted or sewn on for decoration purposes.

Figure 7:
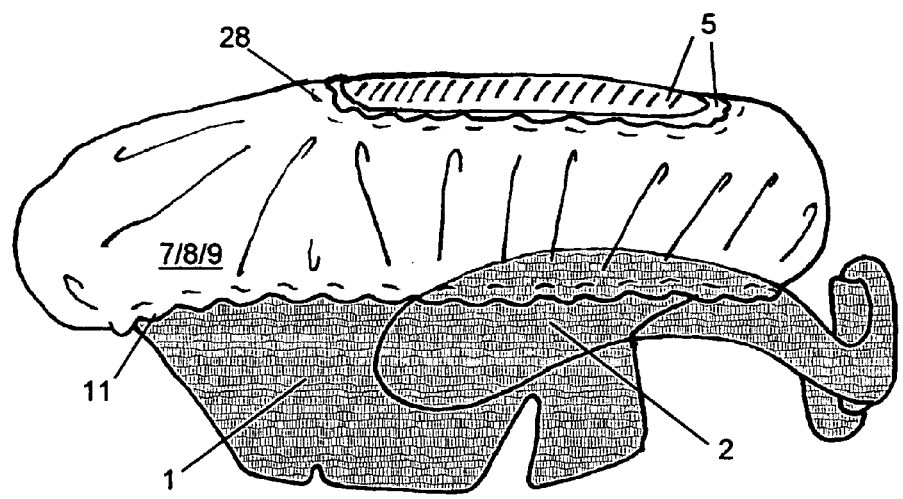
FIG. 7: Basic design diaper bag, side view

FIG. 7 illustrates the cover depicted in FIG. 4, fully assembled with elastic in the outside and inside perimeter casings (11 and 28, respectively) and wrapped around an infant car seat/carrier (1). The handle (2) of the car seat can be easily moved up or down without interference from the invention. All exposed parts of the car seat (1 & 2) have been shaded for purposes of clarity in distinguishing the present invention from prior art while allowing full view of the invention without obstruction as in the case of the handle (2). Part of the view of the invention would be obstructed by the view of the handle (2) of the baby seat if not presented in this manner. The underside of cover (5) can be seen as depicted by the parallel oblique lines at the top of the drawing. The space between the outside of first layer of the cover (5) and the inside of the second layer forms one continuous pocket (7/8/9) in which diapers or other baby implements can be placed. It may be desirable to tack the inside perimeter elastic casing (28) to the first layer (5) at various places such that the pocket will not sag when loaded. This tacking could be accomplished by stitching, hook and loop, snaps or other fastening methods. In this embodiment, an infant could be easily seated and unseated through the cut out in the center of the fabric as depicted in FIG. 3.

Figure 8:
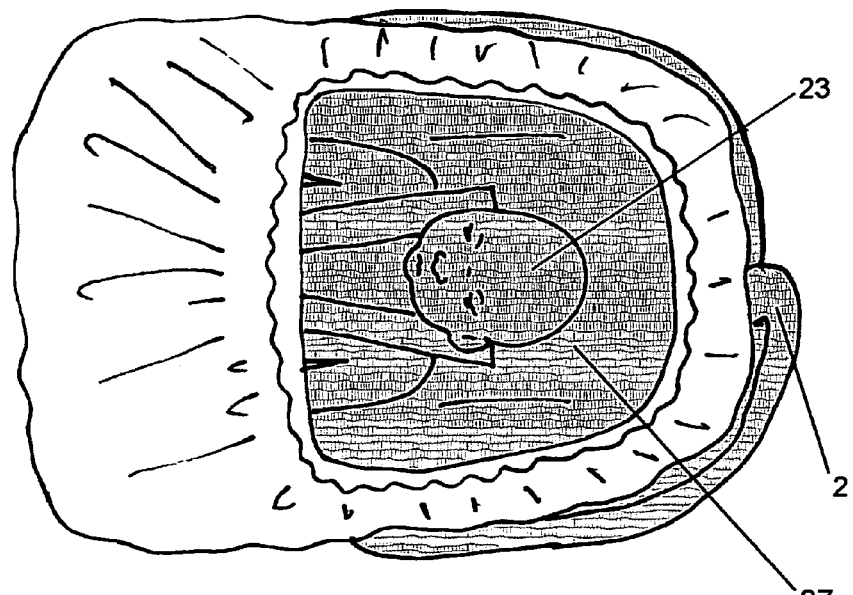
FIG. 8: Basic design diaper bag, top view

FIG. 8 shows the same embodiment of FIG. 7, but from a top view. An infant (23) can be seen seated in the prior art car seat through the hole formed by cutout (37), in the present invention. Because of the large size of cutout (37), the invention would not serve to protect a seated infant from the cold or shelter it from the elements, insects or unsolicited touching from strangers. Prior art car seat covers designed for protection all have a smaller cutout and/or an additional flap or apparatus designed for protection of the seated infant. The handle (2) of the baby seat can also be seen in this view. The perimeter casing (11) of the present invention slips off and on easily such that it does not interfere with the rotation of the handle.

Figure 9:
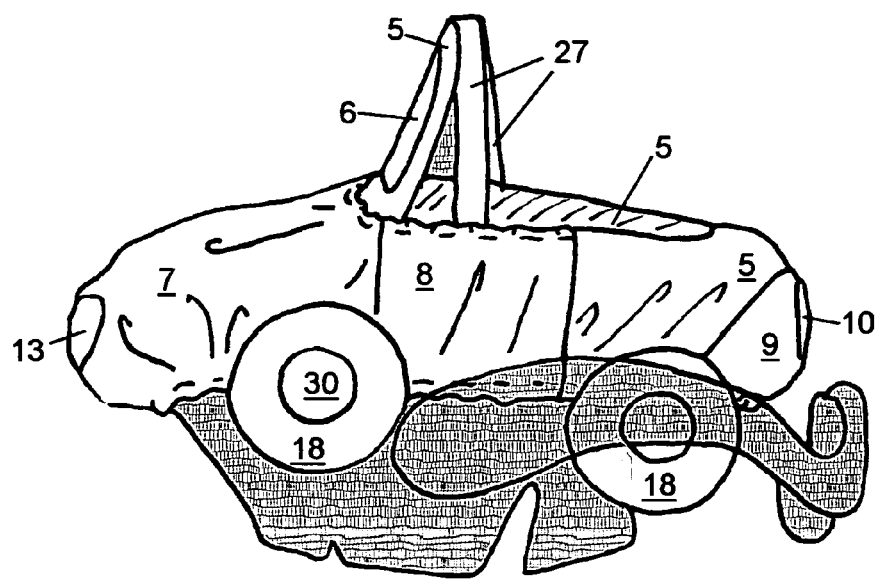
FIG. 9: Car design diaper bag, without hood, side view

FIG. 9 illustrates a side view of the invention in the embodiment made to look like a car with no hood. In this specification, hood will be used to refer to the top of the car which covers the opening where the baby is seated (see FIGS. 13 & 14 for description of hood), which hood can be in the form of a convertible top and kept in the up (closed) position as in FIG. 15 or the down (open) position as in FIG. 19. Hood does not refer to what is normally considered the hood of an automobile which covers the engine. The window (6) is preferably made of a mesh-like textile material and attached to the first cover layer (5) as are the two cloth support mechanisms (27). Both items 6 and 27 are for decoration purposes and have no other real functions. The second layer forms pockets (7, 8 & 9) when attached to the first layer (5). The faux tires (18) consist of two layers with padding in between to give them some fullness and are attached to the second layer in the case of the front tire and the first layer in the case of the rear tire. Items (10), (13) and (30) are for decoration purposes only, but could be made into functional pockets. The shaded area between parts (27) and (5) in the window area is for the purpose of showing empty space in the cover design. This space could be filled with a mesh-like material attached to the first layer (5) and the cloth support mechanism (27) to mimic side window such are found in some automobiles.

Figure 10:
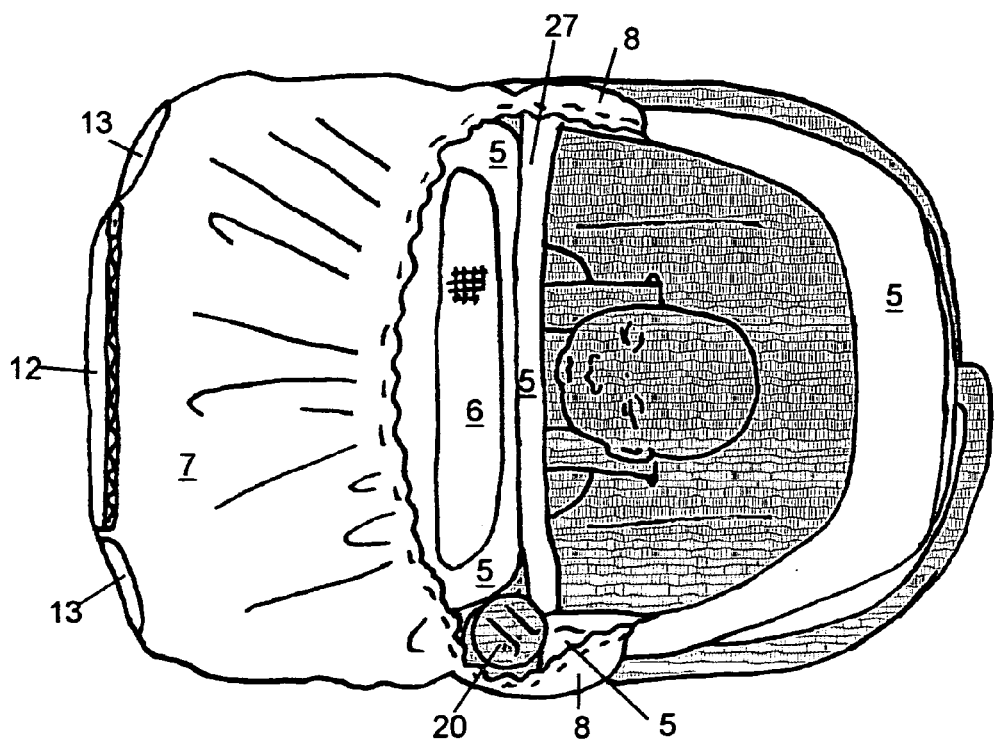
FIG. 10: Car design diaper bag, without hood, with seated infant, top view

In FIG. 10, the cloth support mechanism (27) arches up over the seated infant, supporting the window (6) in an upright position. Zippered pocket 12 is attached to pocket 7. Portions of the first layer (5) are shown where the pockets (7, 8 & 9) do not cover it. The inside of pocket 8 on one side can be seen because of the baby bottle (20) which is nestled in the pocket. Pocket 8 on the other side has no such article protruding from it and therefore does not expose the inside of the pocket.

Figure 11:
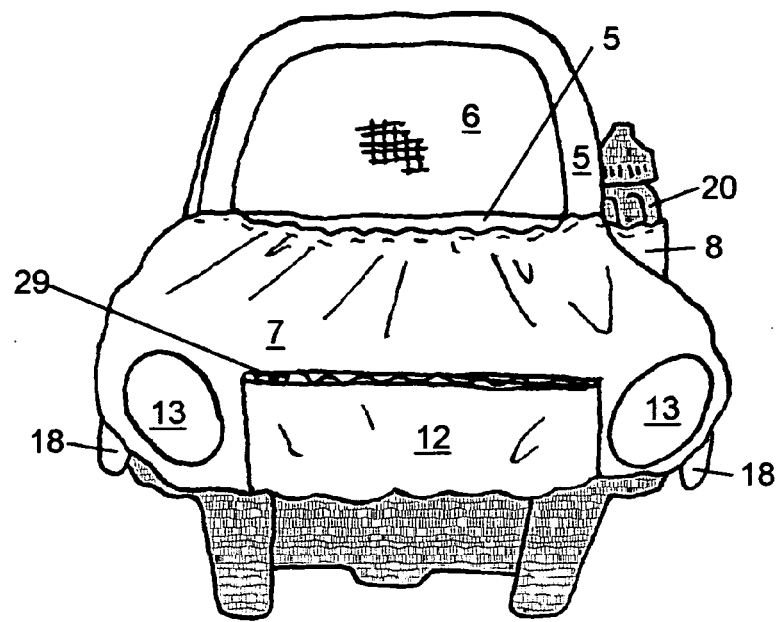
FIG. 11: Car design diaper bag, without hood, front view

FIG. 11 depicts the same embodiment as in FIGS. 9 & 10, but from a front view. From this vantage point, the bottle (20) sitting in pocket 8 can be seen more clearly as can the window (6) and its attachment to the first layer (5). Only the very tips of the front tires (18) can be seen in this view. The zipper (29) at the top of pocket 12 can also be seen more clearly. This pocket (12) could also be padded to make it look more like the bumper of a car, or it could be painted on or sewn shut so it would be just a decoration, not a pocket. As a pocket, it is the perfect size to hold a wallet, checkbook and/or keys.

Figure 12:
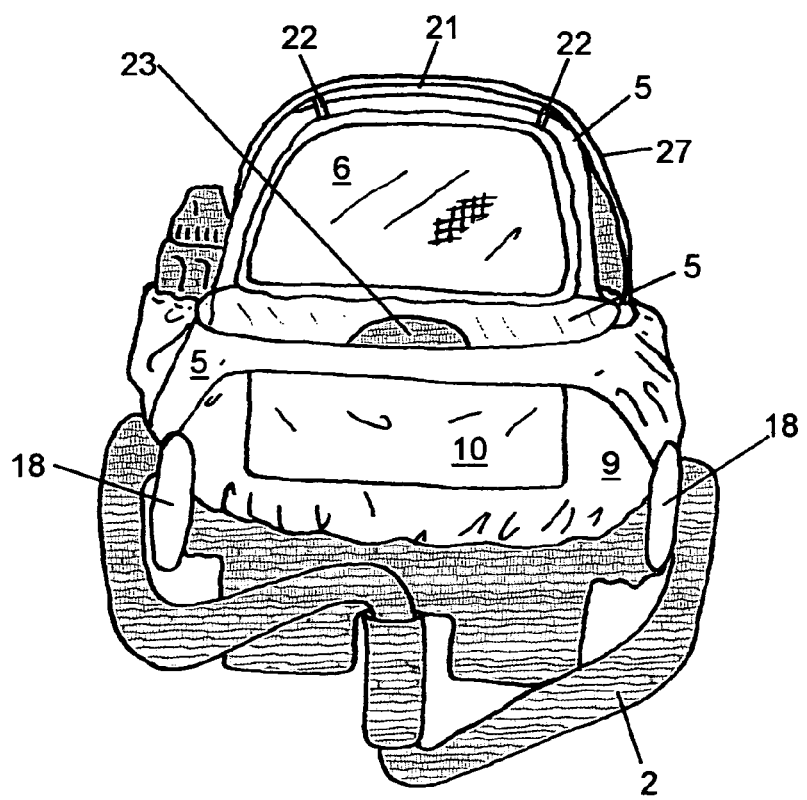
FIG. 12: Car design diaper bag, without hood, rear view

FIG. 12, as a rear view, gives us a better view of the backside of window 6 and its attachment to the invention. In this case, the mesh in window 6 is sewn to the backside of the fabric in the first layer (5). A flexible tubular support (21) holds the window mechanism above the main body of the cover, and from the outside is concealed by the cloth support mechanism (27). Elastic loops (22) hold the tubular support (21) in place. The crown of the head of the infant (23) can be seen poking out of the cover, unobstructed. Pocket 9 is attached to the first layer (5). This pocket does not have an elasticized opening as do the other main pockets, but rather, it lays flat against the first layer (5). This pocket could have an elasticized opening, but because of the location, it does not accommodate items protruding from it. As the handle (2) of the car seat rotates upward, it passes very closely to the back of the invention. Items placed in this pocket must be placed deep in the pocket, out of the way of the handle. Part 10 is just a decoration made to look like a rear bumper of a car. It could be made to be an additional pocket, but is not in this case for the same reason pocket 9 does not have an elasticized opening. In this view, only a profile of the rear tires (18) can be seen.

Figure 13:
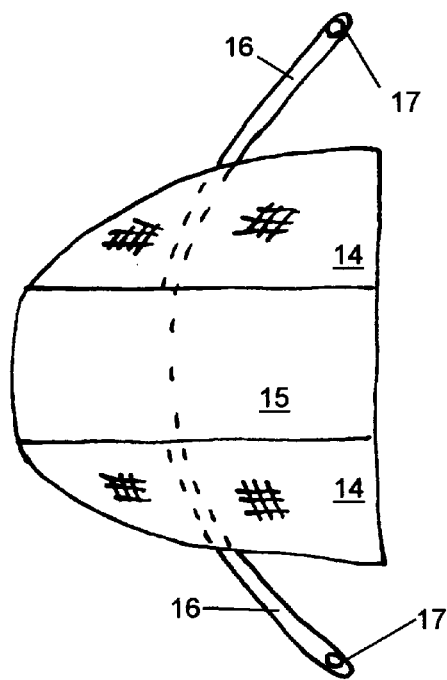
FIG. 13: Car design hood, flat, top view
Figure 14:
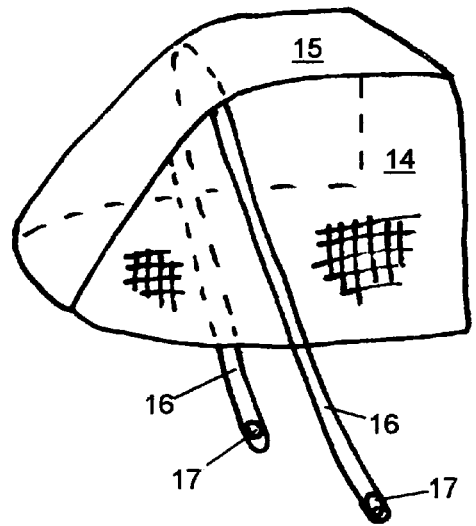
FIG. 14: Car design hood, side top perspective view

FIGS. 13 & 14 depict the hood which is made for decoration purposes only. The two panels (14) on either side of panel 15 are preferably made of the same mesh-type textile material used in FIGS. 5, 6 & 9-12. Panel 15 is constructed of a different type textile material, preferably the same type as used in the previous figures for the body of the invention. White is used so that when the hood is combined with the body of the invention as in FIG. 15, the finished product will resemble a rag-top car. Item (16) is an encased flexible tubular support sewn to the hood to help form the shape. Snaps (17) or other type attachments allow the hood to attach to the hood to the body of the invention such that it will maintain the desired shape. FIG. 13 shows the hood in a flattened state, whereas FIG. 14 shows it in its actual shape. The support member (16) is encased in a cloth-type casing, the snap (17) being attached to the cloth, not the tubing.

FIGS. 15-18 show the hood attached to the body of the invention with a bottle (20) inserted in the side pocket (8). The hood attaches to the body of the cover to the underside of the first layer (5) in the back and to cloth support mechanism (27) by means of hook and loop, snap or other suitable attachment. It can be permanently attached at the back or made to be removable through temporary attachment means such as hook and loop or snaps. The actual attachment method is not as important as the placement. A temporary attachment means is desirable for attachment to the underside of the cloth support mechanism (27) for another embodiment as shown in FIGS. 19-22.

The purpose of the mesh panels (14) in the hood is for visibility of the seated infant and ventilation. Panel (15) could also be constructed of a mesh-type textile material, but that is not the preferred construction. Again the purpose of the hood is for decoration.

Figure 15:
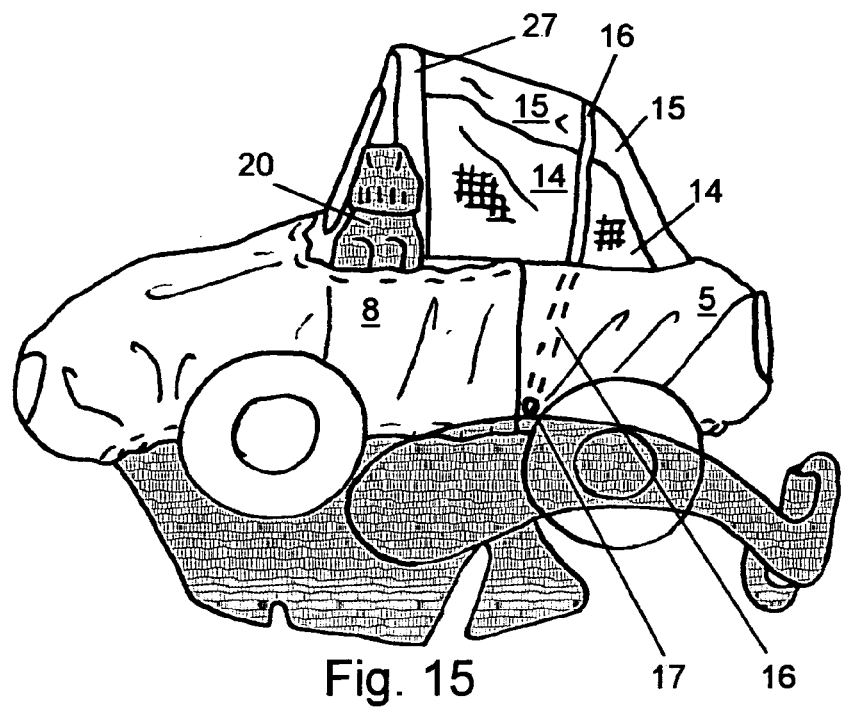
FIG. 15: Car design diaper bag, with hood in up position, side view
Figure 16:
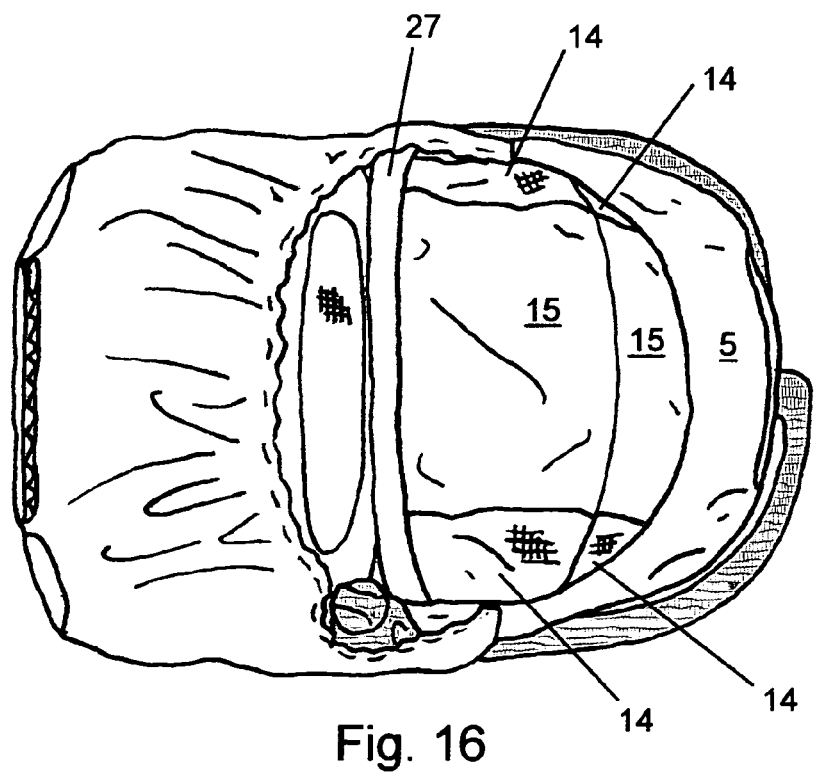
FIG. 16: Car design diaper bag, with hood in up position, top view

The outline of the encased tubular support (16) can be seen in FIG. 15, showing it is under and attached to the first layer (5) by means of a snap (17). The reason for the support extending down to the bottom of the cover instead of ending where the mesh ends is for purposes of supporting the hood when a light-weight textile material is used to construct the first layer (5) of the body of the invention. If heavier weight materials are used for construction of the body of the invention, the encased tubular support (16) could be shortened to end where the mesh ends and attach at the inside perimeter. The purpose of using a snap (17) to fasten the hood to the body at this juncture is so it will act as a hinge for another embodiment as depicted in FIG. 19.

Figure 17:
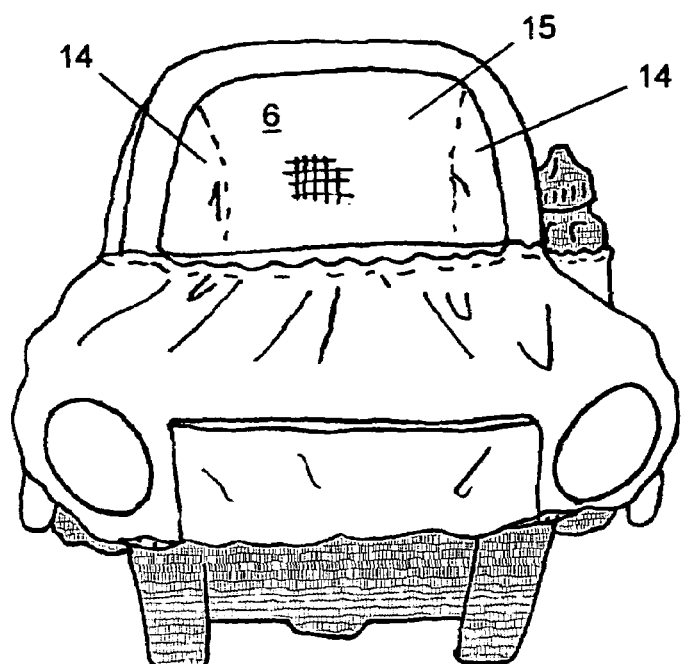
FIG. 17: Car design diaper bag, with hood in up position, front view
Figure 18:
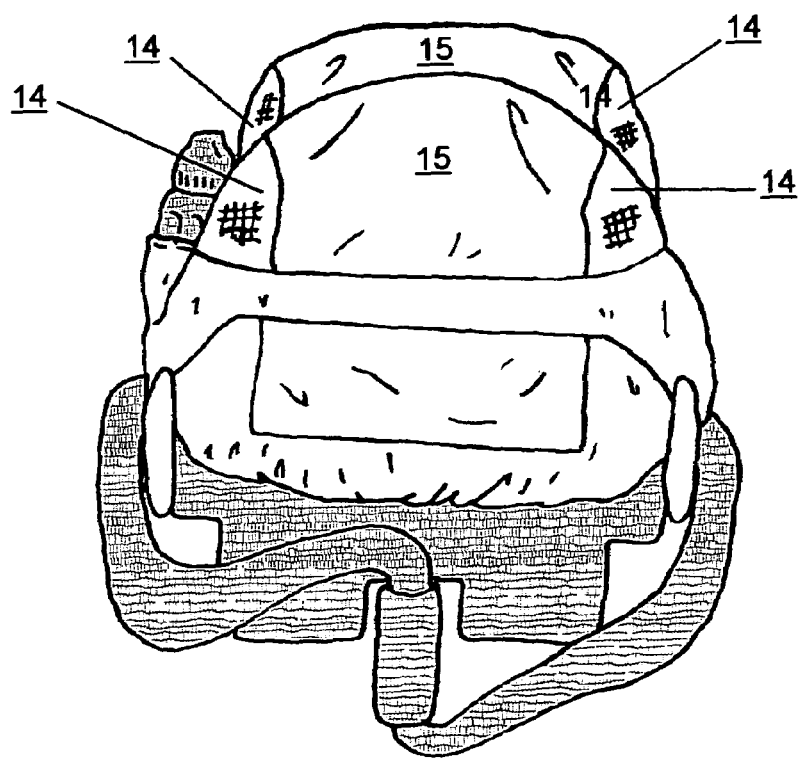
FIG. 18: Car design diaper bag, with hood in up position, rear view
Figure 21:
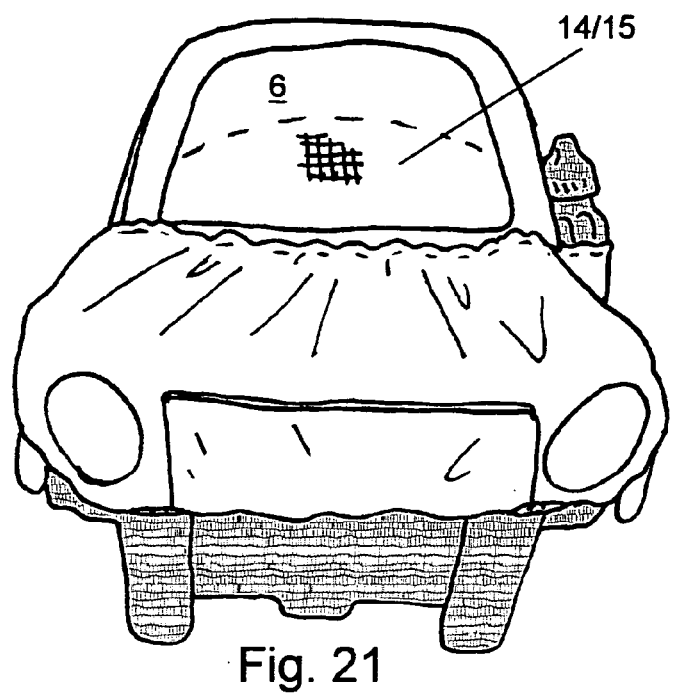
FIG. 21: Car design diaper bag, with hood in down position, front view
Figure 22:
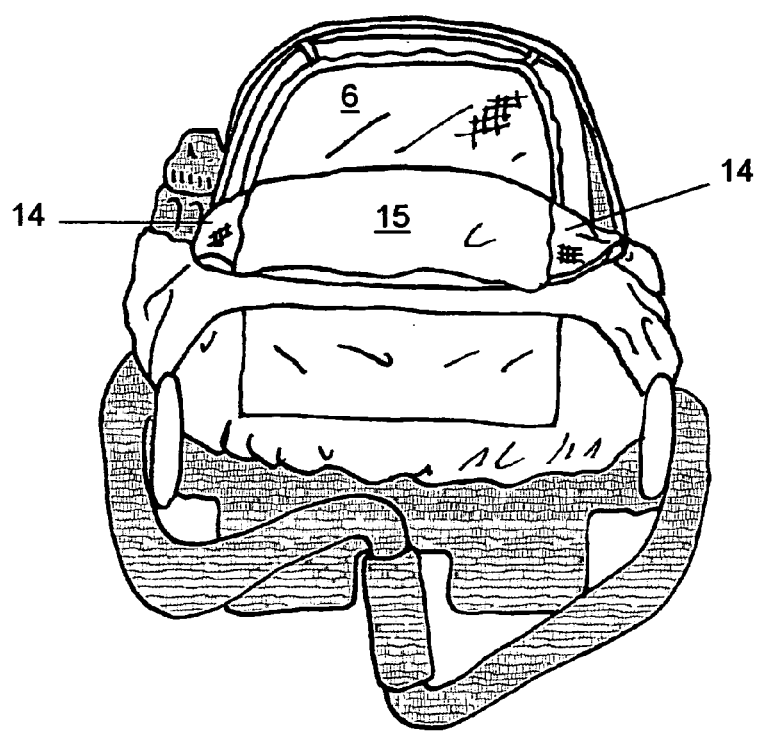
FIG. 22: Car design diaper bag, with hood in down position, rear view

FIGS. 17 & 21 show the underside of the hood (14 & 15) through the front window (6). In FIG. 17, the dotted lines separate panels (14) & (15). In FIG. 21, the dotted line shows the outline of the hood (14 & 15) in the down position, an alternate embodiment of the invention depicted in FIGS. 19-22.

Figure 19:
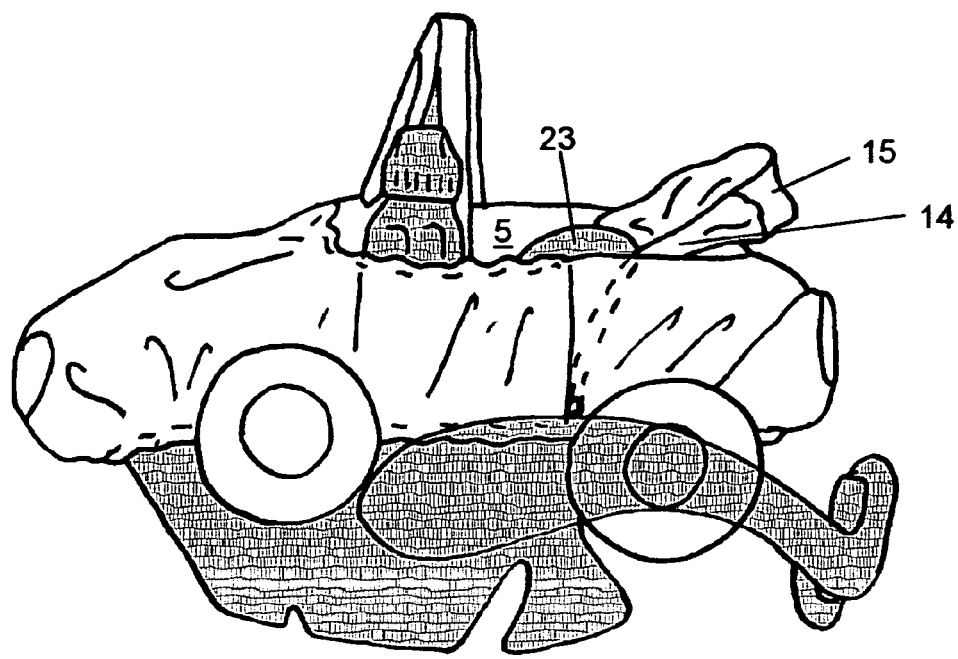
FIG. 19: Car design diaper bag, with hood in down position, with seated infant, side view
Figure 20:
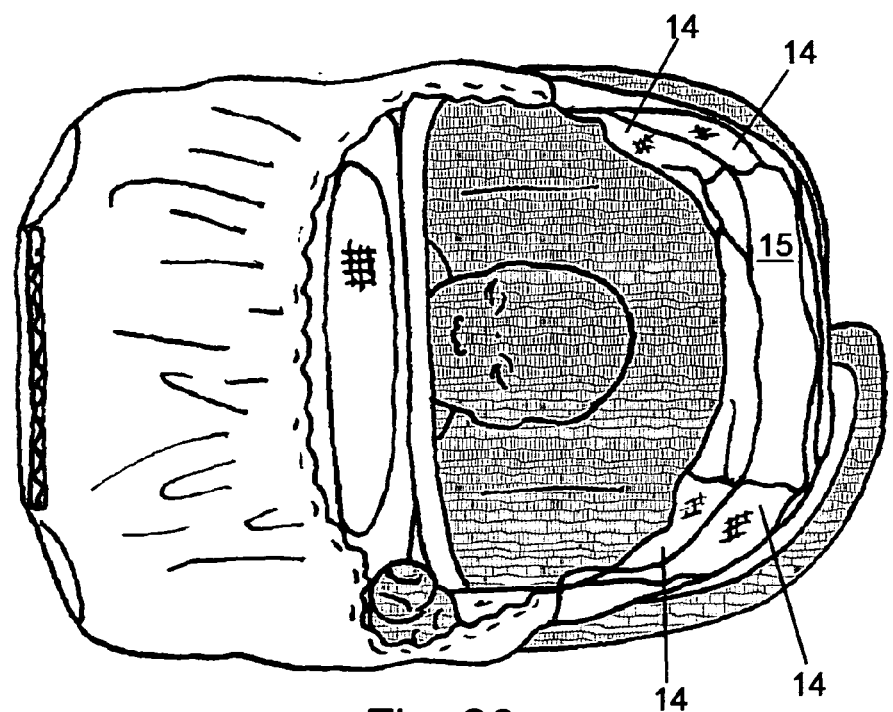
FIG. 20: Car design diaper bag, with hood in down position, with seated infant, top view

In FIG. 19, with the hood (14 & 15) in the down position, the head of the infant (23) and the inside of the first layer (5) of the invention can be seen.

Figure 23:
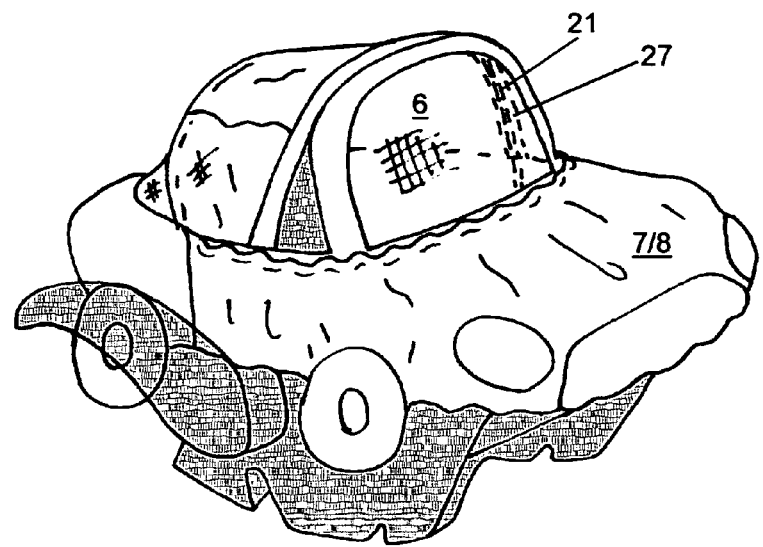
FIG. 23: Car design diaper bag, with hood in up position, side front perspective view

FIG. 23 illustrates how the underside of the cloth support mechanism (27) and the front tubular support (21) can be seen through the front window (6) when the invention is viewed from certain angles. The dotted lines again indicate the parts are being view through the window.

Figure 24:
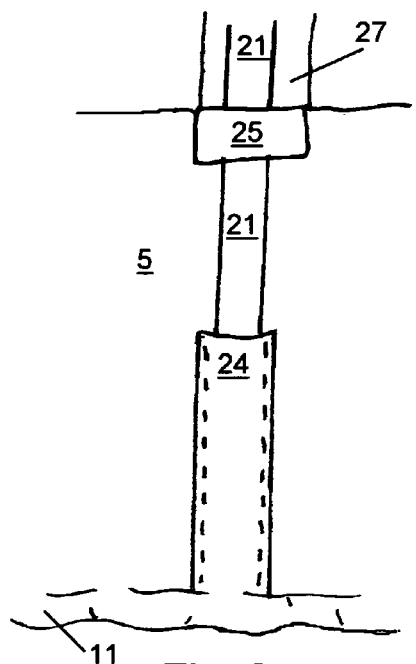
FIG. 24: Removable support attachment means, lower part of cover

FIG. 24 is an enlarged cross-section view of how the tubular support (21) is held in place. The front tubular support (21), which runs along cloth support mechanism (27) and under a piece of hook & loop (25), is placed into a cloth holder (24) and ends where the cloth holder (24) meets the outside elasticized perimeter (11). The front tubular support (21) is U-shaped, so the other end has an identical attachment on the opposite side of the invention. The hook and loop (25) and end holder (24) are sewn to the underside of the first layer (5) of the invention. The hook and loop (25) has a dual purpose in this position: 1) it holds the tubular support (21) in place, and 2) it attaches to a receiving end of hook and loop on the hood to help hold the hood in place. The dotted lines on the various parts in this figure indicate stitching as a means of attaching the part to the invention.

Figure 25:
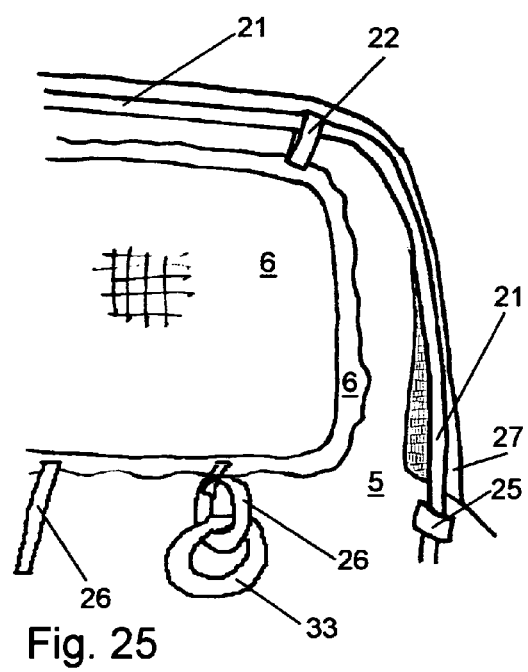
FIG. 25: Removable support attachment means, upper part of cover

FIG. 25 shows an enlargement of a cross-section of the underside of the front window (6) and its attachment to the underside of the first layer (5) of the invention. The front tubular support (21) can be seen running along the cloth support mechanism (27), through hook & loop (25), and through and elastic loop (22) attached to the top of the window (6). Again, the other side of tubular support (21) is placed in an identical manner on the other side of the invention. Some double-sided hook & loop straps (26) for holding toys are shown attached at the bottom of the window (6). The strap on the left is open, whereas the strap on the right is wrapped so that it attaches to itself to form a loop. The flat strap can be threaded through a toy having a ring-like member (33) and attached to itself forming a loop, thereby securing the toy (33) where it can be seen and grabbed by the infant. Secured in the manner, the toy cannot be dropped out of sight of the infant.

Figure 26:
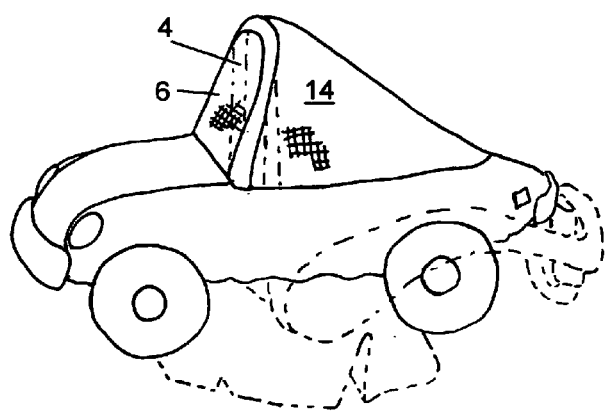
FIG. 26: Alternate hood embodiment using only the sun visor support from the baby seat as a means of support and hood made completely of mesh type textile material
Figure 27:
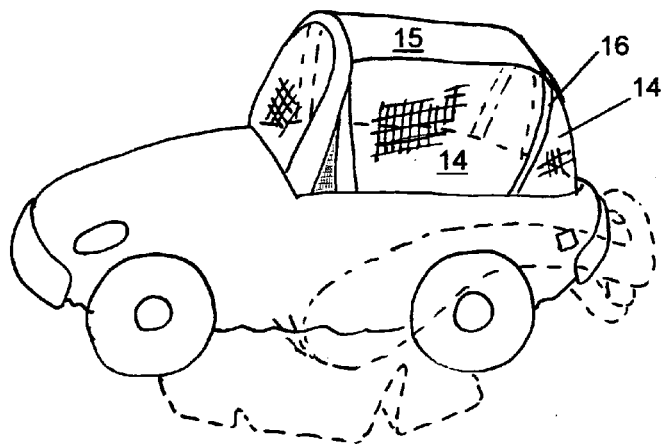
FIG. 27: Alternate hood embodiment with rear hood support closer to the rear of the cover
Figure 28:
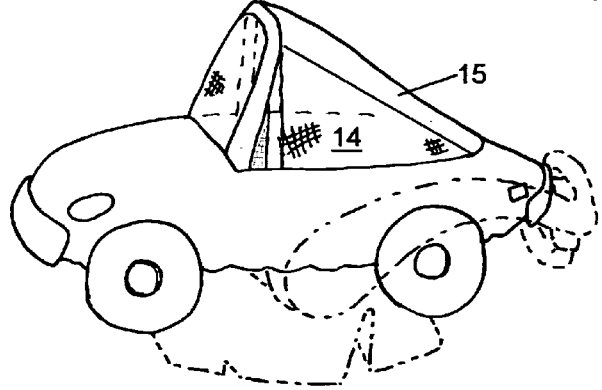
FIG. 28: Alternate hood embodiment with no rear hood support

FIGS. 26-28 show alternate hood embodiments. It is important to note that although these figures show the invention as a cover only, the principles involved apply to the invention as a diaper bag as well. In these figures, the baby seat is depicted as dotted lines instead of shaded as in previous figures. This has not been done on purpose and therefore nothing is meant by it. Also, the sun visor support mechanism (4) from the baby seat is shown as an alternate support in place of the tubular front support noted in FIG. 24. Either support method could be used in these embodiments.

In FIG. 26, the hood (14) in constructed entirely of mesh, with no rear support. In this particular view, the sun visor support mechanism (4) of the baby seat can be seen supporting the cover through the mesh (6 & 14). This figure also shows the front of the cover shaped differently to look like a different style of car.

In FIG. 27, the hood (14 & 15) is constructed as shown in earlier embodiments, but with the shape changed to make the invention look like an SUV-style vehicle. In this embodiment, the rear tubular support (16) is moved back and lengthened to help create the shape.

FIG. 28 also shows the invention with no rear support under the hood (14 & 15) as in FIG. 26, but the hood has the different panels (14 & 15) as shown in the earlier embodiments (excluding FIG. 26).

Figure 29:
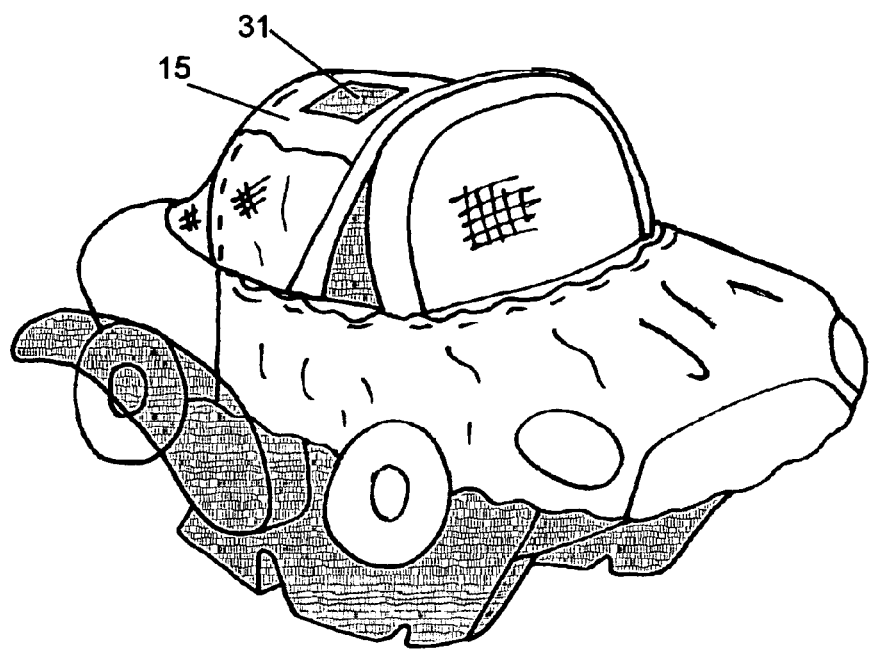
FIG. 29: Car design diaper bag, alternate hood embodiment with sun roof opening, no flap, side top perspective view
Figure 30:
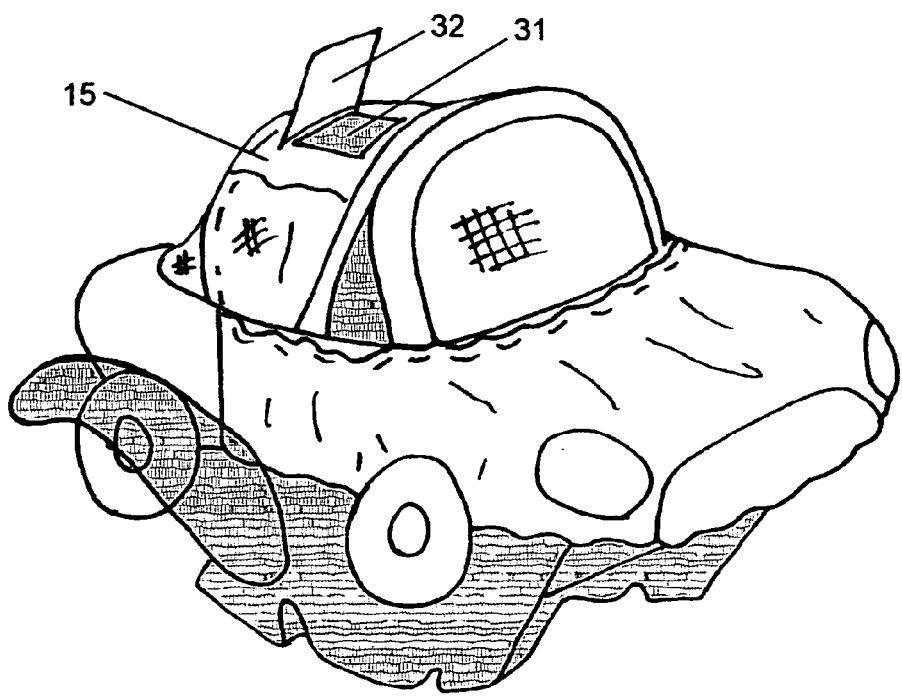
FIG. 30: Car design diaper bag, alternate hood embodiment with sun roof opening, with flap, side top perspective view

FIGS. 29 & 30 show a similar view of the invention as FIG. 23, but with a cutout (31) in the hood (15) and a flap (32) to cover cutout (31). The purpose of this cutout (31) is two-fold: to resemble the sun roof of an automobile, and it creates a hole where by a caregiver of the seated infant can quickly put his or her hand inside the invention to touch the infant or give it a bottle, toy or other item with which to pacify it.

Figure 31:
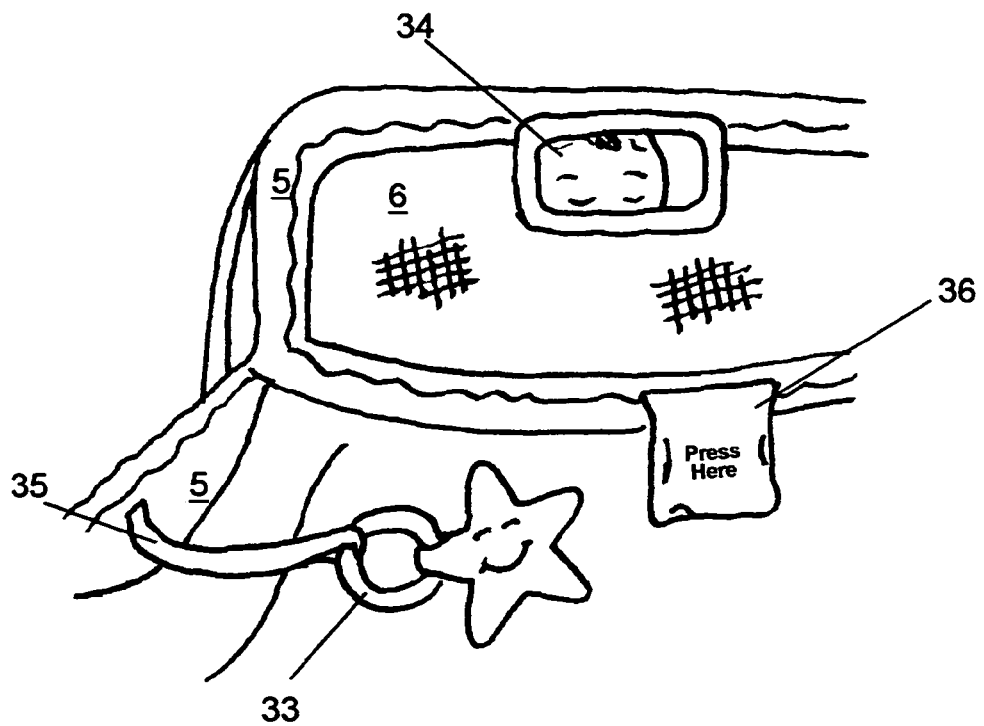
FIG. 31: Car design diaper bag, inside front perspective with mirror, music box and toy tether

FIG. 31 shows an enlargement of a cross-section of the underside of the front window (6) and its attachment to the underside of the first layer (5) of the invention as seen from the seated infant's perspective. A light-weight safety mirror (34) is attached to underside of first layer (5) above front window (6) with hook and loop fasteners. A flat toy tether strap (35) is sewn to underside of first layer (5) on one end, the other end threaded through a toy having a ring-like member (33) and attached to itself with hook and loop fasteners, forming a loop, thereby securing the toy (33) where it can be seen and grabbed by the infant. Secured in this manner, the toy cannot be dropped out of sight of the infant. Faux radio (36) is a music making device that plays a tune when pressed. It is attached to the underside of first layer (5) by hook and loop fastener.

It is important to note that the construction methods and materials described above to create the invention are only sample methods and materials used to describe one mode of carrying out the invention. One skilled in the art can appreciate that other methods and/or materials may exist which could adequately or even more efficiently be used to construct the present invention than those presented in this application without departing from the broad scope of the present invention. The claims incorporated herein are intended to cover said modifications. Said modifications should therefore not be construed as limiting to the claims.

What is claimed:

1. A diaper bag which is mounted on a baby seat, the baby seat having an outer perimeter, the diaper bag comprising:
    at least two layers of material secured to each other along the outer perimeter, the outer perimeter being configured for removably wrapping around the baby seat; and
    an inner opening therein through which a baby can be placed in or removed from the baby seat and through which baby care implements can be placed between the layers of the diaper bag.

2. The diaper bag according to claim 1, further containing one or more support members for holding at least part of the diaper bag suspended above said baby seat in the vicinity of the inner opening.

3. A diaper bag according to claim 1, wherein said baby seat has a support member used for supporting a sun-visor hood, and wherein said diaper bag has one or more attachment means in the vicinity of the inner opening for attaching the diaper bag to the support member of the baby seat such that at least part of the diaper bag can be suspended above the baby seat utilizing said support member.

4. A diaper bag according to claim 3, further comprising at least one attachment means for securing at least one toy to the diaper bag in a position where the seated infant can view and play with said toy(s).

5. A diaper bag according to claim 1, further comprising one or more hoods for attaching to the diaper bag in the vicinity of the inner opening for at least partially covering an infant seated in said baby seat, the hood(s) being at least partially removable from the diaper bag.

6. A diaper bag according to claim 5, further comprising at least one support element in said hood for suspending said hood above said baby seat.

7. A diaper bag for mounting on a baby seat according to claim 1, wherein the inner opening of the upper layer(s) of material is at least as large as the lower layer inner opening, and wherein the perimeter of the upper layer(s) inner opening is at least partially secured to the perimeter of lower layer inner opening.

8. A diaper bag for mounting on a baby seat according to claim 1, which includes a fastening mechanism such as hook-and-loop fastening device or elastic for holding the layers together in the vicinity of the inner opening such that baby care implements placed between the layers will not fall out without disengaging the fastening mechanism.

9. A combination baby seat cover and diaper bag which is mounted on a baby seat, the baby seat having an outer perimeter, the diaper bag comprising:
    at least two layers of material comprising inner and outer layers for wrapping around a baby seat outer perimeter in a tubular fashion, the material having a lower edge and an upper edge, the inner and outer layer(s) secured to each other along the lower edge; and
    an upper perimeter configured for resting on or attaching to the baby seat, leaving an opening through which a baby can be placed in or removed from the baby seat and through which baby care implements can be placed between the layers of the diaper bag.

10. The diaper bag according to claim 9, further containing one or more support members for holding at least part of the diaper bag suspended above said baby seat in the vicinity of the upper perimeter.

11. A diaper bag according to claim 9, wherein said baby seat has a support member used for supporting a sun-visor hood, and wherein said diaper bag has one or more attachment means in the vicinity of the upper perimeter for attaching the diaper bag to the support member of the baby seat such that at least part of the diaper bag can be suspended above the baby seat utilizing the sun-visor support member of the baby seat.

12. A diaper bag according to claim 11, further comprising at least one attachment means for securing at least one toy to the diaper bag or the sun visor support member of said baby seat in a position where the seated infant can view and play with said toy(s).

13. A diaper bag according to claim 9, further comprising one or more hoods for attaching to the diaper bag in the vicinity of the upper perimeter for at least partially covering an infant seated in said baby seat, the hood(s) being at least partially removable from the diaper bag.

14. A diaper bag according to claim 13, further comprising at least one support element in said hood for suspending said hood above said baby seat.

* * * * *